March 30, 1954

M. S. NEWMAN ET AL 2,673,872

STEROID INTERMEDIATES

Filed Nov. 8, 1952

INVENTOR.
MELVIN S. NEWMAN
SAMBASIVA SWAMINATHAN
BY

*Jerome R. Cox*

ATTORNEY

March 30, 1954

M. S. NEWMAN ET AL 2,673,872

STEROID INTERMEDIATES

Filed Nov. 8, 1952

INVENTOR.
MELVIN S. NEWMAN
SAMBASIVA SWAMINATHAN
BY
Jerome R. Cox
ATTORNEY (CORTISONE)

INVENTOR.
MELVIN S. NEWMAN
SAMBASIVA SWAMINATHAN
BY
Jerome R. Cox
ATTORNEY

March 30, 1954   M. S. NEWMAN ET AL   2,673,872
STEROID INTERMEDIATES
Filed Nov. 8, 1952   5 Sheets-Sheet 4
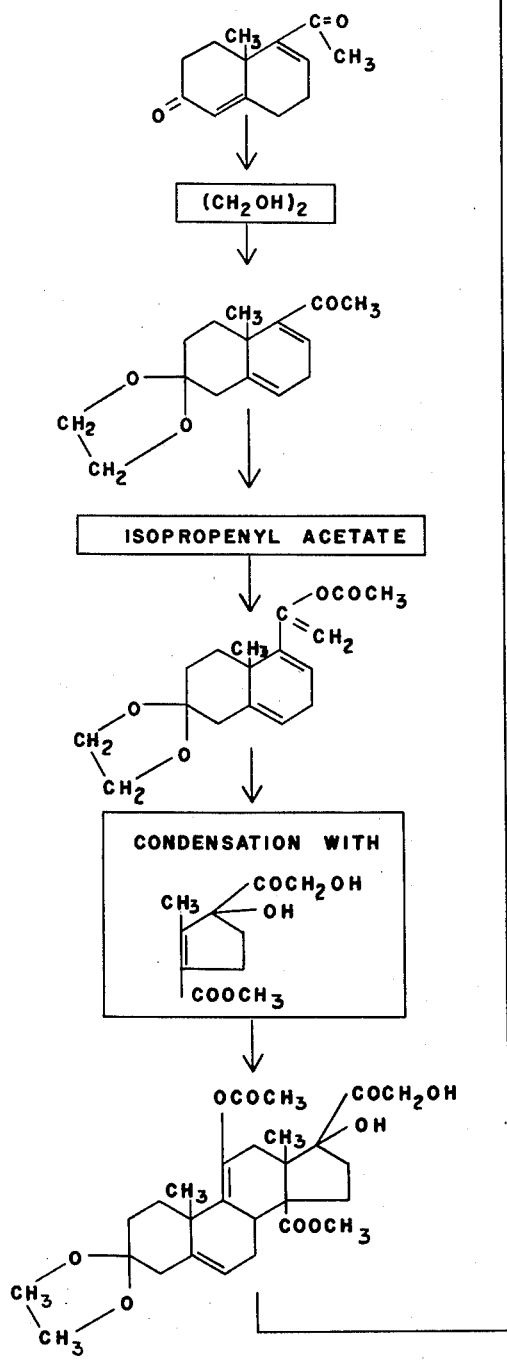
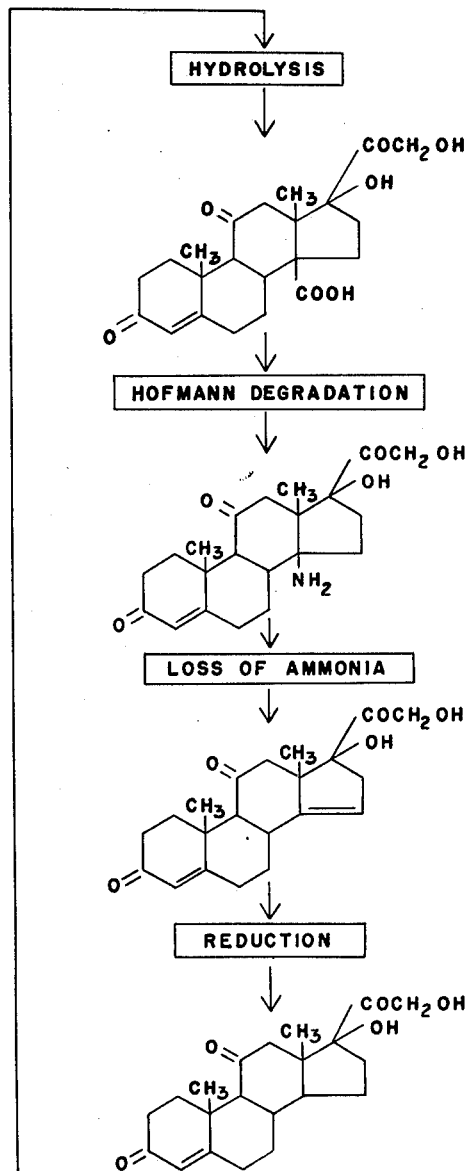
(CORTISONE)
INVENTOR.
MELVIN S. NEWMAN
SAMBASIVA SWAMINATHAN
BY
Jerome R. Cox
ATTORNEY
FIG. 4

(CORTISONE)

INVENTOR.
MELVIN S. NEWMAN
SAMBASIVA SWAMINATHAN
BY
Jerome R. Cox
ATTORNEY

Patented Mar. 30, 1954

2,673,872

UNITED STATES PATENT OFFICE 2,673,872

STEROID INTERMEDIATES

Melvin S. Newman and Sambasiva Swaminathan, Columbus, Ohio, assignors to Ohio State University Research Foundation, Columbus, Ohio, a corporation of Ohio Application November 8, 1952, Serial No. 319,505

4 Claims. (Cl. 260—464)

The invention disclosed in this application relates to new compositions of matter. The application is in part a continuation of application Serial No. 242,981, filed August 21, 1951, now abandoned.

The object of the invention disclosed is to produce new compositions of matter consisting of 1 - hydroxy - 1 - cyano - 6 - alkoxy - 8a - methyl-1,2,3,7,8,8a-hexahydronaphthalene.

These new compounds are useful as intermediates in the total synthesis of steroids and so far as we know have never heretofore been conceived or synthesized.

Figure 1:
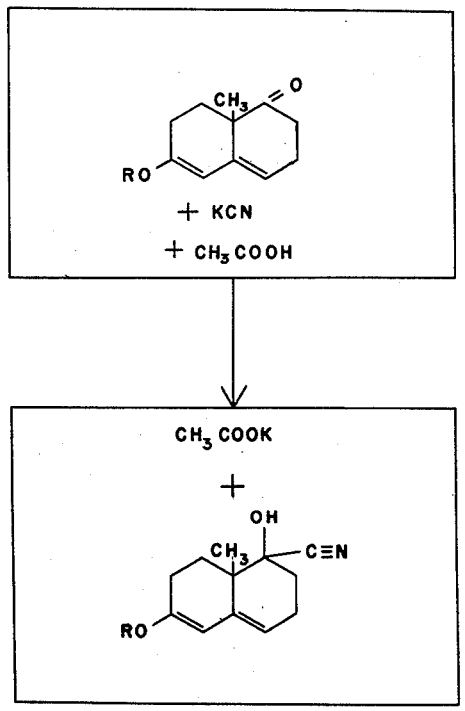
Figure 1 is an illustration of and discloses a process of synthesizing the new compositions of matter disclosed and claimed in this application.
Figure 2:
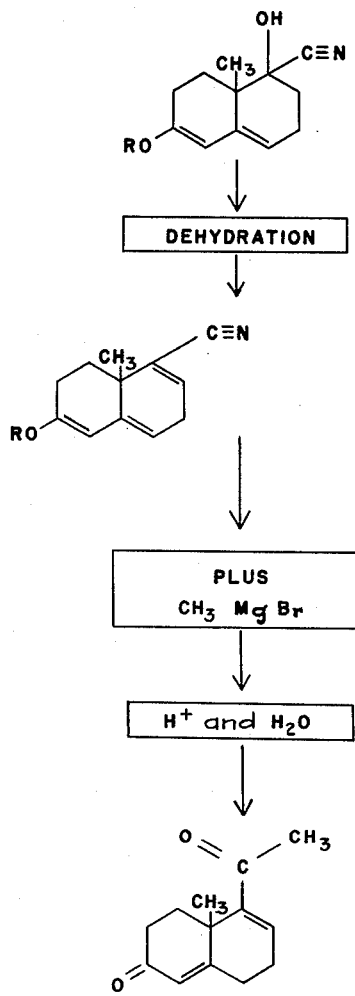
Figure 2 is an illustration of and discloses a process of synthesizing a 1-acetyl-6-Oxo-8a-methyl-3,4,6,7,8,8a hexahydronaphthalene from the new compositions of matter disclosed and claimed herein.
Figure 3:
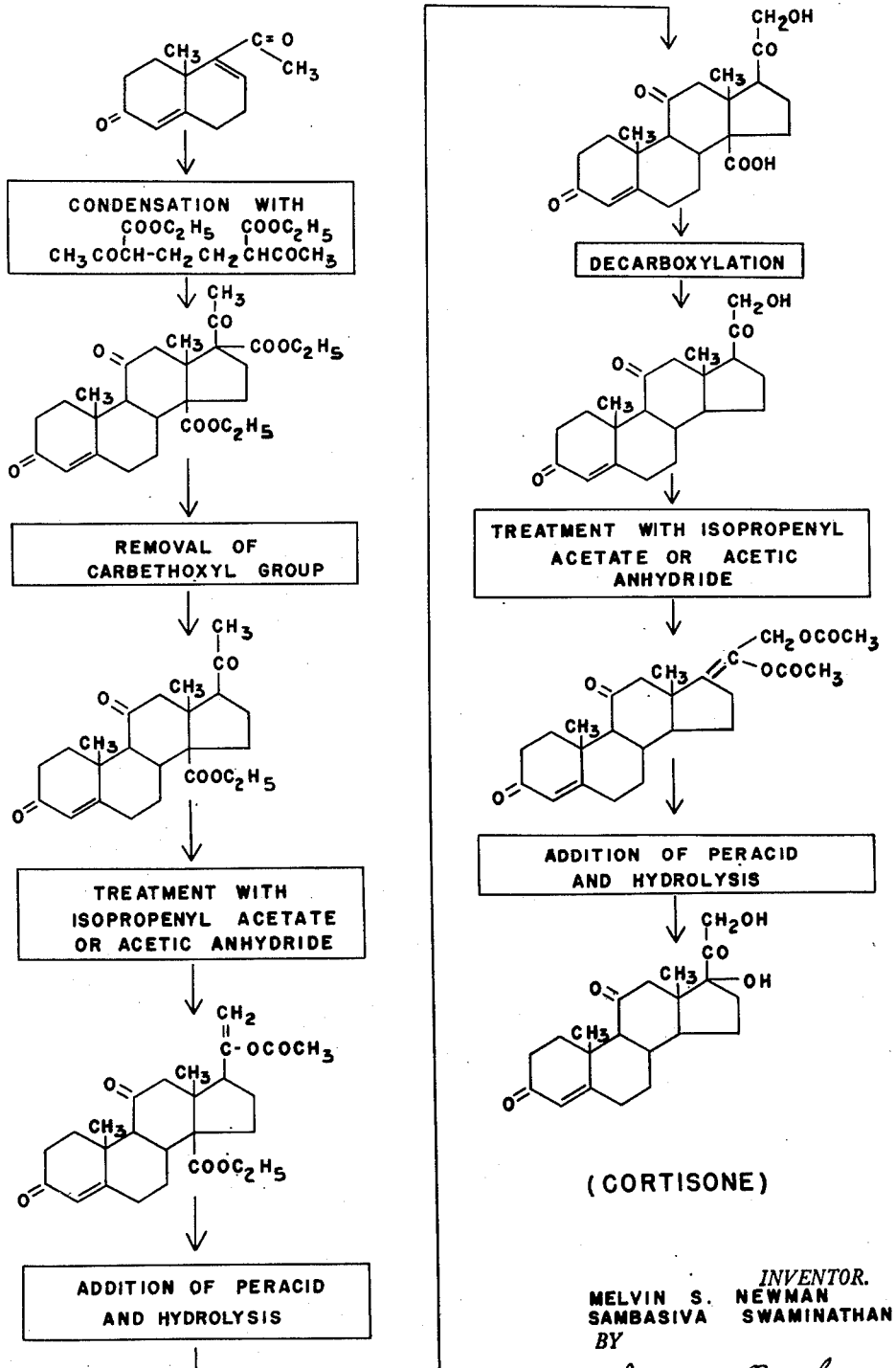
Figure 5:
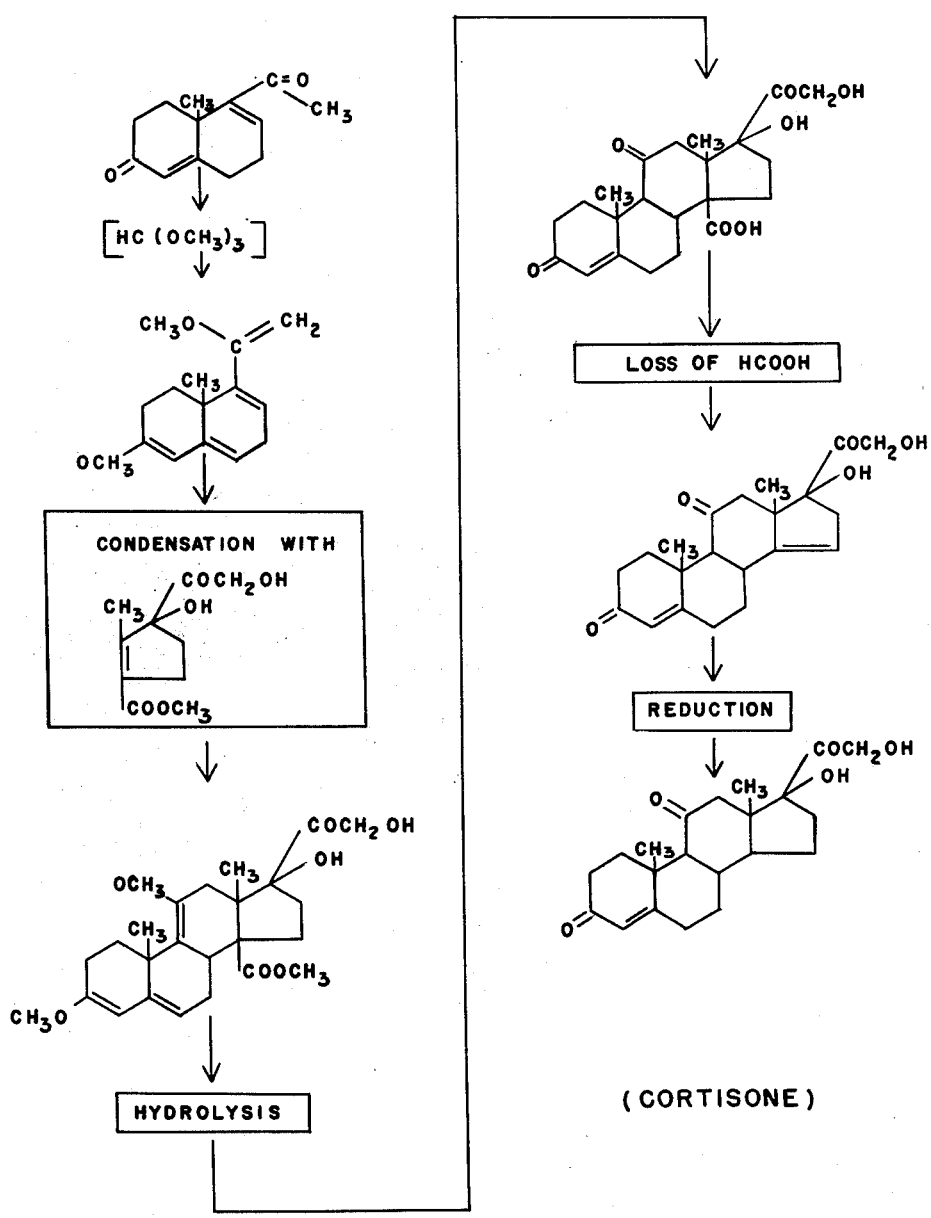

Figures 3, 4, and 5 are illustrations of and disclose several alternative processes of synthesizing cortisone from the product of the process of Figure 2.

Cortisone is useful in medical treatments.

Cortisone may be produced synthetically in one or more of several ways from the 1-hydroxy-1-cyano - 6 - alkoxy - 8a - methyl - 1,2,3,7,8,8a-hexahydronaphthalene disclosed and claimed herein and compounds similar to cortisone and having similar qualities may be produced by slight modifications of the synthesis indicated in Figs. 2, 3, 4, and 5.

Our new composition of matter disclosed and claimed herein is also useful of itself in that it has plant growth regulating qualities. We have found that we can obtain one embodiment of this new composition of matter (i. e. the 1-hydroxy-1 - cyano - 6 - ethoxy - 8a - methyl - 1,2,3,7,8,8a-hexahydro-naphthalene) by the following procedures. As a starting compound, we can use 1,2,3,7,8,8a - hexahydro - 6 - ethoxy - 8a - methyl-1-oxonaphthalene in an ethanolic solution. The starting compound is disclosed and the process of making it is disclosed in application for U. S. patent Serial No. 218,410. In order to produce the new compound, we react the starting compound with hydrogen cyanide in ethanol and obtain the above described new compound. This new compound will have a formula of

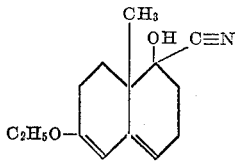

Instead of the 6-ethoxy compound we can obtain the 6-methoxy or the 6-propoxy compound by using the corresponding methoxy or propoxy starting compound. The starting compounds are all disclosed and are claimed as novel compounds in claim 1 of said patent application Serial No. 218,410, Newman and Swaminathan. These starting compounds have a general formula of

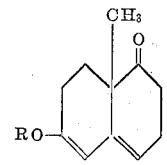

where R is a lower alkyl group. Following are examples of preparation of these new compounds.

Example I

In a one liter two-necked flask provided with a stirrer there should be placed potassium cyanide (99 g.) and ethanol (160 ml.). The mixture should be stirred and cooled in ice; glacial acetic acid (90 ml.) and an ethanolic solution (100 ml.) of 1,2,3,7,8,8a-hexahydro-6-methoxy-8a-methyl-1-oxonaphthalene should be added in succession and dropwise while maintaining good stirring. Small amounts of the glacial acetic acid and the ethanolic solution should be added alternately (i. e. a little at a time). After three hours at 0°, the reaction mixture should be diluted with water (480 ml.) and the solid separated, collected and dried.

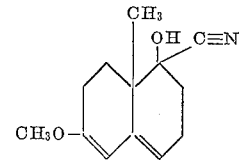

1 - hydroxy - 1 - cyano - 6 - methoxy - 8a - methyl-1,2,3,7,8,8a-hexahydronaphthalene.

Example II

In a one liter two-necked flask provided with a stirrer was placed potassium cyanide (99 g.) and ethanol (160 ml.). The mixture was stirred and cooled in ice; glacial acetic acid (90 ml.) and an ethanolic solution (100 ml.) of 1,2,3,7,8,8a-hexahydro - 6 - ethoxy - 8a - methyl - 1 - oxonaphthalene (24.7 g.) were added in succession (alternately each a little at a time), and dropwise while maintaining good stirring. After three hours at 0°, the reaction mixture was diluted with water (480 ml.) and the yellow solid which separated, was collected and dried (17 g.). The aqueous-alcoholic filtrate on further dilution with water and standing deposited more product (3.2 g.). The crops were combined and crystallized from ether; yield, 13 g.; M. P. 145–155°. After three crystallizations the compound melted at 155–158° and was analyzed.

Analysis: Calcd. for $C_{14}H_{19}NO_2$: C, 72.1; H, 8.2; N, 6.0. Found: C, 71.7; H, 8.0; N, 6.2.
X max: $C_2H_5OH$: 242; $\log_{10}{}^f = 4.3$.
Characteristic infrared absorption bands at 2.88, 4.52, 6.01 and 6.1 microns of a specially refined mineral (petroleum base) oil (Nujol).

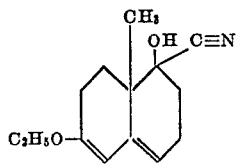

1-hydroxy-1-cyano-6-ethoxy-8a-methyl-1,2,3,7,8,8a-hexahydronaphthalene

*Example III*

In a one liter two-necked flask provided with a stirrer there should be placed potassium cyanide (90 g. and ethanol (160 ml.). The mixture should be stirred and cooled in ice; glacial acetic acid (90 ml.) and an ethanolic solution (100 ml.) of 1,2,3,7,8,8a-hexahydro-6-propyl-8a-methyl-1-oxonaphthalene should be added in succession alternately each a little at a time and dropwise while maintaining good stirring. After three hours at 0°, the reaction mixture should be diluted with water (480 ml.) and the solid separated, collected and dried.

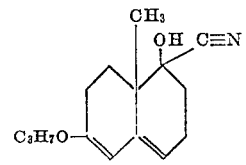

1-hydroxy-1-cyano-6-propoxy-8a-methyl-1,2,3,7,8,8a-hexahydronaphthalene

Modifications of these compounds may be made without departing from the spirit and scope of the invention if comprehended within the appended claims.

We claim:
1. A 1-hydroxy-1-cyano-6-alkoxy-8a-methyl-1,2,3,7,8,8a - hexahydronaphthalene, where the alkoxy group is selected from the class consisting of methoxy, ethoxy and propoxy.
2. A composition of matter consisting of a 1-hydroxy - 1 - cyano - 6 - ethoxy-8a-methyl-1,2,3,7,8,8a-hexahydro-naphthalene.
3. A 1-hydroxyl-1-cyano-6-methoxy-8a-methyl-1,2,3,7,8,8a-hexahydro-napthalene.
4. A composition of matter consisting of a 1-hydroxy - 1 - cyano - 6 - propoxy - 8a - methyl-1,2,3,7,8,8a-hexahydro-naphthalene.

MELVIN S. NEWMAN.
SAMBASIVA SWAMINATHAN.

No references cited.